July 16, 1940.   M. E. McCLELLAN   2,207,812
VEHICLE SUPPORTING STAND
Filed March 13, 1939
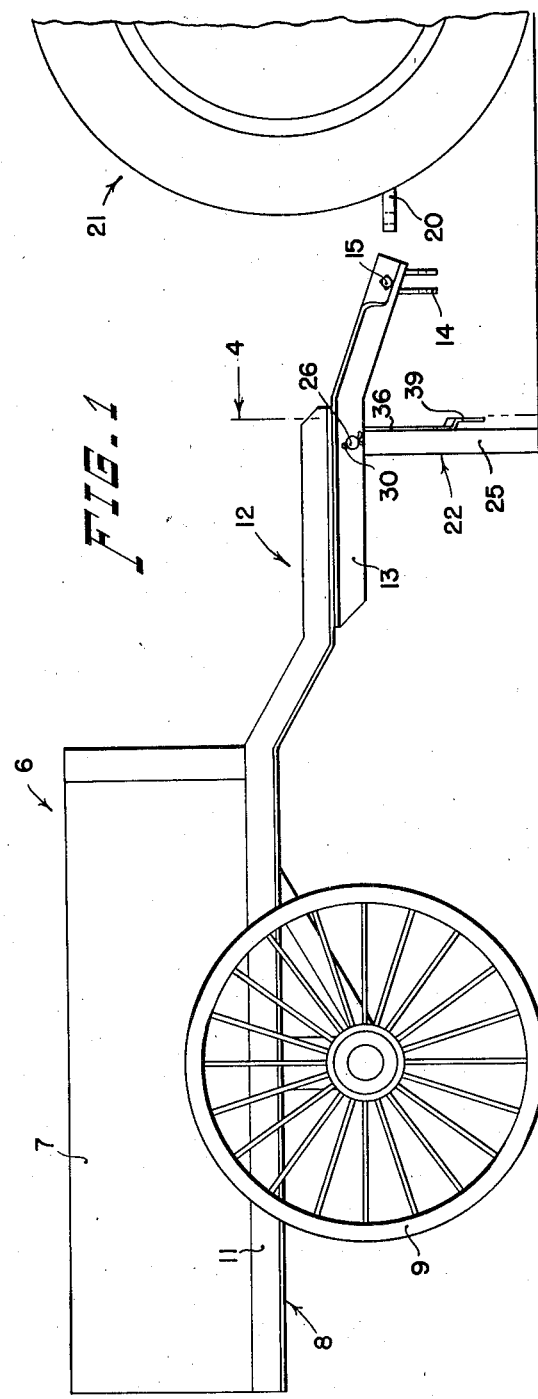
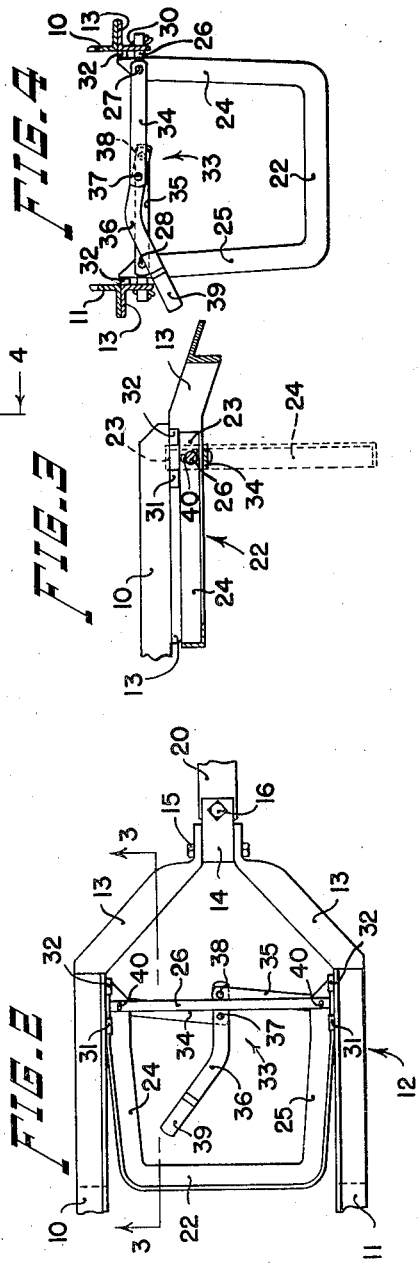
INVENTOR:
MARCUS E. MC CLELLAN.
BY
ATTORNEYS.

Patented July 16, 1940

2,207,812

UNITED STATES PATENT OFFICE 2,207,812

VEHICLE SUPPORTING STAND

Marcus E. McClellan, Ottumwa, Iowa, assignor to Dain Manufacturing Company of Iowa, Ottumwa, Iowa, a corporation of Iowa Application March 13, 1939, Serial No. 261,545

13 Claims. (Cl. 280—33.4)

The present invention relates to means for supporting a two-wheeled trailer vehicle when disconnected from the propelling tractor, and has for its principal object the provision of an improved, simple and sturdy folding stand adapted for use on the draft member of a two-wheeled vehicle to hold the same at a predetermined height above the ground when the draft member is not supported on the drawbar or other mounting connection of a tractor.

Another object is to provide improved means for locking the folding support stand in either raised or lowered position. More specifically, it is an object of the present invention to provide a U-shaped supporting stand, the arms of which are pivoted on the vehicle frame and are urged into engagement with abutments thereon for holding the stand in either raised or lowered position, and link means for springing the arms out of engagement with the said abutments to allow the stand to be swung from one position to the other.

These and other objects and advantages of the present invention will become apparent to those skilled in the art after consideration of the following detailed description of the preferred embodiment thereof, reference being had to the appended drawing, in which Figure 1 is a side elevational view of a two wheeled trailer vehicle, showing the front end of the vehicle supported on a stand embodying the principles of my invention;

Figure 2 is a fragmentary plan view of the draft member and supporting stand, showing the latter in raised position for transport;

Figure 3 is a sectional view taken substantially along the line 3—3 in Figure 2, and illustrating in broken lines the manner in which the stand is locked in lowered position; and Figure 4 is a sectional view taken along the line 4—4 of Figure 1, showing the lever arm locked in released position, and the arms of the U-shaped stand drawn together.

Referring now to the drawing, the vehicle is indicated in its entirety by the reference numeral 6 and comprises a body 7 mounted on a frame 8 that is carried on a pair of supporting ground wheels 9. The frame 8 consists of two laterally spaced, fore and aft extending angle iron members 10 and 11, the front ends of which extend forwardly beyond the vehicle body 7 and downwardly to form a draft member 12. Angle irons 13 are fixed, as by welding, to the under sides of the frame members 10, 11 and extend forwardly and downwardly therefrom in converging relation. The front ends of the angle irons 13 are bent into parallelism and are spaced apart to receive between them a hitch clevis 14. The clevis 14 is connected to the front ends of the angle irons 13 by a transverse pivot bolt 15, and is adapted to be connected by a vertical bolt 16 to the drawbar 20 of a tractor 21.

In two-wheeled vehicles of the present type, a portion of the weight of the vehicle is normally supported on the tractor drawbar 20 by reason of the fact that the center of gravity of the vehicle is located ahead of the wheel axle. When such a vehicle is disconnected from the tractor, the draft member 13 will drop to the ground unless it is propped up by some suitable support, and to this end it is customary to provide the draft member with a supporting stand in order to facilitate the operations of coupling and uncoupling the vehicle and tractor.

The improved folding stand with which my invention is concerned comprises a U-shaped member 22, preferably made of angle iron, disposed transversely of the draft member 12 and having arms 24 and 25 spaced laterally for a relatively snug fit between the frame members 13. The arms 24, 25 are swingably supported near their ends on a transverse shaft 26, and are connected therewith for axial sliding as well as swinging movement. The shaft 26 is carried by the draft members 13 in suitable holes provided therein and is held in place by cotter pins 30. Each of the arms 24, 25 of the U-shaped stand 22 is continued beyond the shaft 26 for a short distance to provide an extension 23 that cooperates with the limit stop means described hereinafter to lock the stand in either raised or lowered position.

Each of the draft members 13 is provided on its inner face with a pair of limit stop projections or lugs 31, 32 disposed somewhat above the shaft 26 and arranged symmetrically on either side thereof. The lugs 31, 32 extend inwardly toward the center line of the draft member 12 and are adapted to engage the arms 24, 25 of the stand 22 when the latter is either raised or lowered, as shown in Figure 3. In the raised transport position, each arm 24, 25 is brought under both of its respective lugs 31, 32, and since the lugs are disposed on opposite sides of the shaft 26, the stand 22 is prevented from swinging in either direction. In the lowered or vertical position, shown in broken lines in Figure 3, the arm extension 23 drops into the recess between its respective lugs 31, 32 and is thereby held against swinging in either direction.

The U-shaped stand 22 is released from its engagement with the limit stop lugs 31, 32 by means of a toggle link arrangement 33 that operates to draw the arm 24, 25 together sufficiently to clear the lugs 31, 32, as shown in Figure 4, and the stand may then be swung from either one position to the other. As brought out previously, the U-shaped stand 22 is formed of angle iron with the arms 24, 25 thereof spaced apart for a relatively snug fit between the draft members 13, and accordingly the inward bending of the arms by the toggle link device 33 is resisted by the natural spring or resiliency of the angle iron beam. To overcome this resistance, the toggle link device 33 is given a fairly large mechanical advantage, and in its preferred form consists of a pair of links 34 and 35 connected by pivot bolts 27, 28, respectively, to the arms 24, 25 closely adjacent the shaft 26. The links 34, 35 are also pivotally connected at two spaced points 37 and 38 to one end of a releasing lever 36 positioned midway between the arms 24, 25, said lever having an offset portion 39 at the other end thereof that serves as a handle. Cotter pins 40 are passed through the transverse shaft 26 between the arms 24, 25 and adjacent thereto to provide limit stops for limiting the inward movement of the arms along the shaft. Thus if one of the arms 24, 25 becomes jammed on the shaft 26, the other arm will stop against the cotter pin 40 and provide purchase for loosening the jammed arm.

The operation of my invention is as follows: When it is desired to lower the supporting stand prior to uncoupling the vehicle from the tractor, the operator pulls the handle 39 of the lever 36 toward the right side of the vehicle, thereby springing the arms 24, 25 inwardly until they clear the limit stops 31, 32. The U-shaped stand 22 then swings downwardly to the ground of its own weight, and the tractor and vehicle are backed up until the stand swings up to vertical position, lifting the weight of the draft member from the tractor drawbar. While the stand 22 is in any intermediate position between the raised and lowered positions shown, the arms 24, 25 are bent inwardly by the limit stops 31, 32 against which they bear, and consequently the arms are urged outwardly by the resiliency of the U-shaped member. Thus, as the stand 22 arrives at the vertical position, the arm extensions 23 register with the recesses between their respective limit stops 31, 32 and spring into the said recesses, locking the stand against further swinging. The weight of the draft member is now carried entirely by the stand, and the clevis 14 may readily be disconnected from the drawbar 20.

The stand is raised to transport position after the vehicle has been connected to the tractor, by pulling the lever 36 toward the right side of the vehicle, springing the arms 24, 25 inwardly clear of the limit stop lugs 31, 32, to the position shown in Figure 4, bringing the two pivot connections 37, 38 past a center line drawn through the pivot connections 27, 28 and thereby forming an overcenter lock in which the outward resilient thrust of the arms 24, 25 operates to hold the lever arm 36 up against the draft frame member 13. The operator is then free to mount to his station on the tractor and drive the implement forward, swinging the stand rearwardly and lowering the weight of the draft member 12 onto the drawbar 20. The tractor is then stopped and the stand is raised manually to transport position, after which the lever 36 is released from its over-center lock to return to normal position, and locked therein by the engagement of the arms 24, 25 under the limit stop projections 31, 32.

What I claim as my invention is:

1. A supporting stand for a vehicle comprising a pair of spaced arms, means pivotally connecting said arms to said vehicle for vertical swinging between raised and lowered positions, limit stop means on said vehicle engageable with said arms to hold said stand in selected position, said arms being yieldingly urged into engagement with said limit stop means, and means for forcing said arms out of engagement with said limit stop means to allow the stand to be swung to the other position.

2. A supporting stand for a vehicle frame comprising, in combination, a pair of spaced arms, pivot means connecting said arms to said frame for vertical swinging between raised and lowered positions, limit stop means on said vehicle frame adapted to engage said arms in either of said positions, said arms being movable along the axis of said pivotal connecting means and urged in opposite directions along said axis into engagement with said limit stop means, and means for moving said arms in opposite directions and out of engagement with said limit stop means to allow the stand to be swung from one position to the other.

3. A supporting stand for a vehicle frame comprising, in combination, a pair of spaced arms, means connecting said arms together, pivot means connecting said arms to said frame for vertical swinging between raised and lowered positions, limit stop means projecting from said vehicle and adapted to abut against said arms for locking the latter in either of said positions, said arms being movable along the axis of said pivotal connecting means and urged in opposite directions along said axis into engagement with said limit stop means, and means for moving said arms in opposite directions away from said limit stop means to clear the same and allow the stand to be swung from one position to the other.

4. For use with a vehicle having a frame including a pair of spaced members, and a pair of ground wheels journaled on said frame, a folding support comprising a U-shaped stand disposed between said spaced members, limit stop lugs projecting from the adjacent sides of said spaced members, the arms of said U-shaped stand being pivotally connected with said spaced members for vertical swinging between raised and lowered positions and engaged by said limit stop projections in either of said positions, and means for springing the arms of said U-shaped stand inwardly to clear said projections and allow the stand to be moved from one position to the other.

5. For use with a vehicle having a frame including a pair of laterally spaced members, and a pair of ground wheels journaled on said frame, a U-shaped supporting stand disposed between said spaced members, transverse pivot means connecting the arms of said U-shaped stand with said spaced members for vertical swinging movement between raised and lowered positions, limit stop lugs projecting inwardly from said spaced members, the arms of said U-shaped stand being movable along the axis of said transverse pivot means and urged outwardly into engagement with said limit stop lugs when the stand is in either raised or lowered positions, and link means connecting said arms together for springing the same inwardly to clear said lugs and allow the stand to be swung from one position to the other.

6. For use with a vehicle having a frame including a pair of laterally spaced members, and a pair of ground wheels journaled on said frame, a U-shaped supporting stand disposed between said spaced members, transverse pivot means connecting the arms of said U-shaped stand with said spaced members for vertical swinging movement between raised and lowered positions, limit stop lugs projecting inwardly from said spaced members, the arms of said U-shaped stand being movable along the axis of said transverse pivot means and urged outwardly into engagement with said limit stop lugs when the stand is in either raised or lowered positions, a link pivotally connected to one of said arms, a second link pivotally connected to the other arm, an operating lever, and means connecting said links to said lever at two spaced points whereby movement of said lever in one direction causes said links to draw the arms of said stand inwardly to clear said lugs and allow the stand to be swung from one position to the other.

7. In combination with a vehicle having a frame, a pair of laterally spaced draft members, and ground wheels journaled on said frame, a transverse shaft fixed to and extending between said draft members, a U-shaped supporting stand disposed between said draft members and journaled on said transverse shaft for vertical swinging between raised and lowered positions, limit stop lugs projecting inwardly from said draft members, the arms of said U-shaped stand being slidable along the length of said transverse shaft and urged outwardly to engage said limit stop lugs when the stand is in either raised or lowered position, a pair of links connected one to each of said arms adjacent said transverse shaft, and an operating lever, said links being connected to said lever at two spaced points whereby movement of the lever causes said links to draw said arms inwardly to clear said lugs and allow the stand to be swung from one position to the other.

8. A vehicle supporting stand of the class described comprising a member having a pair of spaced arms, means connecting said arms to the vehicle for vertical swinging movement between raised and lowered positions about a horizontal axis, said connecting means providing for movement of said arms along said axis, limit stop means on the vehicle engageable with said arms for holding the stand in lowered position, said arms being yieldingly urged into engagement with said limit stop means, and releasing means connected with each of said arms for moving the same out of engagement with said limit stop means, said releasing means being movable to an over-center locking position for holding the arms out of engagement with the limit stop means.

9. A vehicle supporting stand of the class described comprising a member having a pair of spaced arms, means connecting said arms to the vehicle for vertical swinging movement between raised and lowered positions about a horizontal axis, said connecting means providing for movement of said arms along said axis, limit stop means on the vehicle engageable with said arms for holding the stand in lowered position, said arms being yieldingly urged into engagement with said limit stop means, a pair of links connected one to each of said arms, and a releasing lever, said links being connected to said lever at spaced points whereby movement of the lever acts to force said arms out of engagement with said limit stop means, said lever being movable to an over-center locking position abutting against the vehicle for holding the arms out of engagement with the limit stop means.

10. An auxiliary supporting stand for a vehicle comprising an arm pivotally connected with the vehicle for vertical swinging between raised transport position and lowered operative position, and locking means on said vehicle engageable with said arm in at least one of said positions, said arm being movable along the axis of rotation into and out of engagement with said locking means.

11. A supporting stand for a vehicle comprising a pair of spaced arms pivotally connected to the vehicle for vertical swinging between raised and lowered positions, limit stop means on the vehicle adapted to engage one of said arms for holding the stand in selected position, said one arm being biased for movement in the direction of said limit stop means to engage the same, and means for forcing said one arm in the opposite direction to disengage the arm from said limit stop means and allow the stand to be swung to the other position.

12. A supporting stand for a vehicle comprising a U-shaped member having the arms thereof pivotally connected with said vehicle for vertical swinging movement between raised and lowered positions, said arms being yieldingly urged in opposite directions, means on said vehicle engaged by at least one of said arms for holding the stand in one of said positions, and link means interconnecting said arms and operative to move said one arm out of engagement with said means on the vehicle to allow the stand to be swung to the other position.

13. A supporting stand for a vehicle comprising a U-shaped member, pivot means connecting the arms of said member with said vehicle for vertical swinging movement between raised and lowered positions, said arms being yieldingly urged apart, means on said vehicle engaged by at least one of said arms for holding the stand in selected position, and means for forcing said arms together to disengage said one arm from said means on the vehicle.

MARCUS E. McCLELLAN.